(12) United States Patent
Decime et al.

(10) Patent No.: US 9,602,534 B2
(45) Date of Patent: *Mar. 21, 2017

(54) MONITORING AND MITIGATING CLIENT-SIDE EXPLOITATION OF APPLICATION FLAWS

(71) Applicant: Hewlett-Packard Development Company, L.P., Houston, TX (US)

(72) Inventors: Jerry Brent Decime, Eagle, ID (US); Cale Stefan Smith, Boise, ID (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/711,768

(22) Filed: May 14, 2015

(65) Prior Publication Data
US 2015/0249678 A1 Sep. 3, 2015

Related U.S. Application Data

(63) Continuation of application No. 13/751,695, filed on Jan. 28, 2013, now Pat. No. 9,083,736.

(51) Int. Cl.
*G06F 11/00* (2006.01)
*G08B 23/00* (2006.01)
(Continued)

(52) U.S. Cl.
CPC ......... *H04L 63/1441* (2013.01); *G06F 21/52* (2013.01); *G06F 21/57* (2013.01); *H04L 63/1416* (2013.01); *G06F 2221/033* (2013.01)

(58) Field of Classification Search
CPC ............ H04L 63/1416; H04L 63/1408; H04L 63/1441; H04L 63/1458; G06F 21/552
(Continued)

(56) References Cited

U.S. PATENT DOCUMENTS 8,578,482 B1 * 11/2013 Yang ................ G06F 21/51
726/22
8,752,183 B1 * 6/2014 Heiderich ............ G06F 21/577
726/22

(Continued)

OTHER PUBLICATIONS

"Cross Site Scripting (XSS) Attacks: Methodology and Prevention"; https://www.golemtechnologies.com/articles/prevent-xss; 7 pages (Jan. 7, 2013).

(Continued)

*Primary Examiner* — Evans Desrosiers
(74) *Attorney, Agent, or Firm* — Rathe Lindenbaum LLP

(57) ABSTRACT

A system for monitoring and mitigating client-side exploitation of application flaws includes a server to operate a first application. The first application communicates with a client device operating a second application to execute an application flaw script. The application flaw script causes the client device to produce a first request associated with vulnerability of the first application. An application flaw service module, communicatively coupled to the server, receives the first request from the client device comprising transactional metadata based on the application flaw script and inspects the transactional metadata for malicious content within the first request.

17 Claims, 4 Drawing Sheets

(51) Int. Cl.
*H04L 29/06* (2006.01)
*G06F 21/52* (2013.01)
*G06F 21/57* (2013.01)

(58) Field of Classification Search
USPC ..... 713/153–154, 187–188, 193–194; 726/1, 726/13, 22–33; 709/206, 249, 389
See application file for complete search history.

(56) References Cited

U.S. PATENT DOCUMENTS

| | | |
|---|---|---|
| 2007/0016948 A1 | 1/2007 | Dubrovsky et al. |
| 2009/0119769 A1 | 5/2009 | Ross et al. |
| 2009/0282480 A1 | 11/2009 | Lee et al. |
| 2011/0099467 A1 | 4/2011 | Kapur et al. |
| 2011/0214182 A1 | 9/2011 | Adams et al. |
| 2012/0222123 A1 | 8/2012 | Williams et al. |
| 2012/0304275 A1 | 11/2012 | Ji et al. |
| 2013/0263247 A1 | 10/2013 | Jungck et al. |

OTHER PUBLICATIONS

Kirda, E., et al.; "Client-side Cross-site Scripting Protection"; Nov. 22, 2007; 13 pages.

* cited by examiner

MONITORING AND MITIGATING CLIENT-SIDE EXPLOITATION OF APPLICATION FLAWS

CROSS-REFERENCE TO RELATED PATENT APPLICATIONS

The present application is a continuation application coming priority under 35 USC 120 from U.S. patent application Ser. No. 13/751,695 filed on Jan. 28, 2013 by Jerry Brent Decime and Cale Smith and entitled MONITORING AND MITIGATING CLIENT-SIDE EXPLOITATION OF APPLICATION FLAWS, the full disclosure of which is hereby incorporated by reference.

BACKGROUND

Communication between computing devices in the context of client-server environments are subject to a number of security vulnerabilities. Cross-site scripting, for example, within the context of a web-based client uses known vulnerabilities in web-based applications, their servers, or plug-in systems to exploit a client. By exploiting a web-based application, its server or a plug-in system, a third party may cause malicious content to be added into the content being delivered from the now compromised solution and executed within a client state. When the resulting combined content arrives at the client-side web browser, it has all been delivered from what has been purported to be a trusted source. The client-side system then operates under the permissions granted to that system.

BRIEF DESCRIPTION OF THE DRAWINGS

The accompanying drawings illustrate various examples of the principles described herein and are a part of the specification within the context of a web-application, web-server client server interaction. The examples do not limit the scope of the claims.

Throughout the drawings, identical reference numbers designate similar, but not necessarily identical, elements.

DETAILED DESCRIPTION

Figure 1:
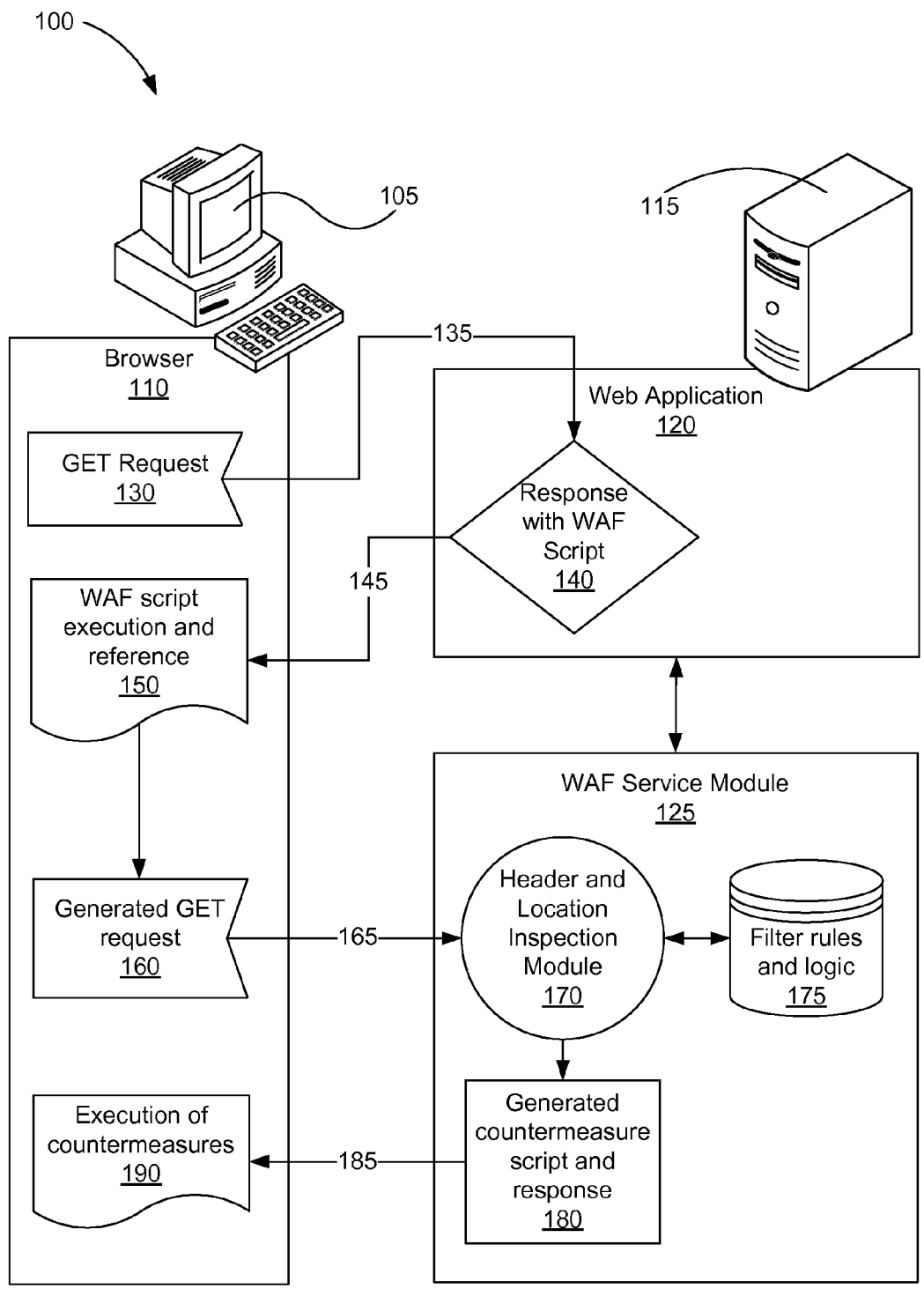
FIG. 1 is a block diagram depicting system for monitoring and mitigating client-side exploitation of web-application flaws according to one example of the principles described herein.

As described above, web applications may include a number of security vulnerabilities that allow malicious computer code to be transferred from a web server to a client-side device during communication of those two devices. Many examples exist where a client-side device receives content from a web server under the guise of that content containing computer code that will not harm the client-side device or otherwise use information on that device for nefarious purposes. Certain methods have been implemented in order to mitigate the exploitation of these security vulnerabilities, however the security vulnerabilities are resolved at the web server rather that the client-side device. Other methods have been implemented to prevent such vulnerabilities on the client side; but are specific to a particular client technology and further fail to allow detailed operational control from server-side solutions.

Many times the available resources located on each client-side device are overlooked as possible resources which may be used to mitigate these vulnerabilities. Indeed, server side mitigation by either fixing code before a response is sent out to a client device or by the introduction of application firewalls can be time and resource intensive. This is especially more difficult across large organizations where each response to every device is swept for potentially nefarious code. Even further, the lack of insight into the frequency of any type of exploitation and attack of the server or its system can prevent a client application owner from realizing any potential vulnerabilities that may exist. This lack of insight may lead to unnecessary debate among technical staff on how to best approach a certain type of exploitation or handle all incoming attacks to the network on which the web server operates.

The present specification therefore discloses a system for monitoring and mitigating client-side exploitation of application flaws as applicable to web or other client-server based application solutions, the system comprising a client device, a server communicatively coupled to the client device, and a application flaw service module communicatively coupled to the client device and server in which the application flaw service module receives a request from the client device comprising transactional metadata and inspecting that transactional metadata for malicious content within the request. The present specification further describes a method of monitoring and mitigating client-side exploitation of application flaws by adding computer usable program code to the beginning of a response to a first request from a web browser, receiving a second request from client, determining that transactional metadata within the response contains a known attack vector, and returning a response to the browser including attack vector countermeasures embedded in the response. Still further, the present specification describes a computer program product for monitoring and mitigating client-side exploitation of application flaws, the computer program product comprising a computer readable storage medium comprising computer usable program code embodied therewith, the computer usable program code comprising computer usable program code to, when executed by a processor, add computer usable program code to the beginning of a response to a first request from a web browser, computer usable program code to, when executed by a processor, receive a second request from the web browser, computer usable program code to, when executed by a processor, determine that transactional metadata within the response contains a known attack vector, and computer usable program code to, when executed by a processor, return a response to the client including attack vector countermeasures embedded in the response.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language indicates that a particular feature, structure, or characteristic described in connection with that example is included as described, but may not be included in other examples.

In the present specification and in the appended claims, the term "request" is meant to be understood broadly as a method used by a client application to indicate the desired action to be performed on the identified resource. In an example of a web-application, a request may be a GET request which requests a representation of a specified resource on a web application server.

Additionally, in the present specification and in the appended claims, the term "attack vector" is meant to be understood broadly as any technique often used to attack a web application. One example is SQL injection which is a code injection technique that exploits security vulnerabilities in a web application's software.

Still further, in the present specification and in the appended claims, the term "application" is meant to be understood broadly as any computer program code designed to help a user of a computing device perform specific tasks. Therefore, an application may include any client-server application by which information is transmitted from one computing device to another. In the case of the present specification, the application will be described in terms of a web-application. However the present specification contemplates the use of any of the above defined types of applications.

Turning now to FIG. 1, a system (100) for monitoring and mitigating client-side exploitation of web-application flaws is shown according to one example of the principles described herein. Although, FIG. 1 depicts a system for monitoring and mitigating client-side exploitation of web-application flaws, the present specification also contemplates that the described system may monitor and mitigate client-side exploitation of any flaws associated with any type of application as defined above. For ease of explanation, however, the following description will describe the system, method and computer program product in terms of a web-application.

FIG. 1 shows a client device (105) operating a web browser (110) communicatively coupled to a server (115) running a web application (120). The client device (105) may further be communicatively coupled to a web application flaw (WAF) service module (125).

The client device (105) may be any type of computing device that can connect to a network and communicate with the server (115). The client device (105) may therefore comprise a processor, a data storage device, a network adapter, and a user interface. The processor may receive instructions from computer readable program code stored on the data storage device. The computer readable program code, when executed by the processor, may at least establish a network connection with the server (115) and, in one example, the WAF service module (125). Additionally, the processor may execute computer readable program code associated with a browser application (110) and may cause the application to run on the client device (105). The processor may further execute computer readable program code, the execution of which at least sends a request to a server (115) to, for example, query a database and retrieve data such as HTML pages, JSP pages, and servlets, among others. In one example, the processor may specifically do this by executing a GET request. A GET request may request a representation of the specified resource from the server (115).

The data storage device may include various types of memory devices, including volatile and nonvolatile memory. For example, the data storage device of the present example may include Random Access Memory (RAM), Read Only Memory (ROM), and Hard Disk Drive (HDD) memory, among others. The present specification contemplates the use of many varying type(s) of memory in the data storage device as may suit a particular application of the principles described herein. In certain examples, different types of memory in the data storage device may be used for different data storage needs. In certain examples, the processor may boot from the Read Only Memory (ROM), maintain nonvolatile storage in the Hard Disk Drive (HDD) memory, and execute program code stored in Random Access Memory (RAM).

Generally, the data storage device may comprise a computer readable storage medium. For example, the data storage device may be, but not limited to, an electronic, magnetic, optical, electromagnetic, infrared, or semiconductor system, apparatus, or device, or any suitable combination of the system, apparatus, or device. More specific examples of the computer readable storage medium may include, for example, the following: a portable computer diskette, a hard disk, a random access memory (RAM), a read-only memory (ROM), an erasable programmable read-only memory (EPROM), flash memory, byte-addressable non-volatile memory (phase change memory, memristors), a portable compact disc read-only memory (CD-ROM), or any suitable combination of the foregoing, among others. In the context of this document, a computer readable storage medium may be any tangible medium that may contain, or store a program for use by or in connection with an instruction execution system, apparatus, or device.

The network adapter may provide communication between the various devices and modules (105, 115, 125). As will be described below, the network adapter may provide a user of the client device (105) with the ability to connect to communicate with the server (115) and WAF service module (125). Through the network adapter, data may be transferred to and from these devices to facilitate the operation of the system and method described herein.

The user interface may be any hardware or software and hardware that enable a user to interact with the system (100), any programs or applications running on the system (100), or any other devices associated with the system. Through the interface, a user may be allowed to interact with a web application (120) or WAF service module (125) to facilitate the operation of the system and method described herein.

In operation, the processor associated with the client device (105) of the system (100) may execute computer readable program code to initiate, for example, browser application (110). Accessing a web application (120) the browser (110) may send (135) a GET request (130) to the server (115). The GET request (130) sent to the web application (120) may be one of many requests a browser application (110) may send. For purposes in convenience in explanation, however, the system (100) will be described in terms of a GET request (130) being sent. The present description, however, contemplates a number of requests that may be sent to a server (115) running a web application (120).

Having received the GET request (130) from the browser application (110), the web application (120) may return (145) a response (140) to the browser application (110). The returned (145) response includes a web application flaw (WAF) script. The WAF script is an embedded JAVASCRIPT® that is placed at the start of, for example, a hypertext transfer protocol (HTTP) body response. The WAF script included in the response (140) may be provided by the WAF service module (125).

This allows the WAF script to be executed at the top of the document object model (DOM) stack. Placing this at the top of the DOM stack gives the WAF script, being executed by the processor, control over the document object model because the WAF script will be executed by the browser application (110) first. This may further allow the web application (120) to control, for example, when rewrites to the web page are completed and how they are completed. Therefore, in the case where a script has been added due to a cross-site scripting vulnerability, the WAF script added to the response (140) will prevent any third party from gaining control of the response before the client browser (110) does.

Because this script is added to the response (140), a third party may also deliver the script to any number of servers (115) running any number of web applications (120). As a result, the provider of the WAF script may be a third party security provider with which the operator of the server (115) and web application (120) contracts with to provide the script language as a service.

In other examples, the WAF script may be included in within script of a web application (120) page template, added to computer readable program code associated with the application, by using proxy injection, or any other method used while publishing HyperText Markup Language (HTML) of the web page. Therefore, the present specification contemplates these alternative methods of incorporating the WAF script into the response sent back to the browser application (110).

In one example where an organization controls both web applications (120) and all HTTP responses traversing a proxy used by that organization, similar WAF script may be added to all those HTTP responses as well. This mitigates any additional browser same-origin vulnerabilities.

After receiving the response with WAF script (140), the browser (110) may execute (150) the WAF script and perform a basic inspection of the response (140). Specifically, because the script is running within the same top level domain, the client device (105) inspects the contents of the GET request and response header to determine if there is any client-side script that may prevent proper execution. If the response contains any known attack vector which could lead to GET based XSS exploitation or any other exploitation which can be mitigated on the client-side, it returns a response instructing the browser (110) to make another GET request (130).

As described above, although the present example describes the client device (105) as operating a web-application (120) using a browser (110), the present specification contemplates the use of any type of application. Therefore, in one example, the application (120) may add transactional metadata to the response as described above. In this example, therefore, application flaw script may be added to the transactional metadata in the response.

Continuing on with the previous example, the generated GET request (160) will include the contents of the document as well as the name of the location of the attack vector. The GET request (160) is sent (165) to the WAF Service Module (125). The WAF service module (125) may then inspect the HTTP header with a header and location inspection module (170). During inspection, the header and locations location module (170) may use a database (175) of filter rules and logic to clean any cookies or malicious content provided in the generated GET request (160). If any action is necessary as part of the inspection, the WAF service module (125) includes a countermeasure script into a response (180) to the browser (110). The response and countermeasures are then sent (185) to the browser (110). After receiving the generated countermeasure script and response (180) from the WAF service module (125) the browser (110) executes the countermeasures (190).

In addition to cross-site scripting mitigation, the system (100) may monitor for common exploration of application vulnerabilities. These vulnerabilities may be detected by way of, for example, a GET request inspection in combination with HTTP header inspection and client response inspection. The vulnerability monitoring conducted by the system (100) may include the detection of exploitation attempts involving SQL injection, session management tampering, insecure direct object references, cross-site-request forgery, insufficient transport security, broad URL access, and non-validated redirects and forwards, among other.

In cases where the server (115) may not be available within the same top level domain as the web application or where the application limits header exposure through path cookies, the headers may also be provided through various ways by way of the originating request to the service or by way of script or application, such as Flash, delivery. Through the monitoring and correlation of requests over time the system (100) can detect inconsistencies between requests made using the GET method and the HTTP headers which would indicate tampering.

The system (100) described above describes the WAF service module (125) in terms of being a component of the system (100) separate from either the client device (105) or the server (115). In this example, the WAF service module (125) may be hardware or hardware and software included on a server separate from the client device (105) or server (115). In another example, the WAF service module (125) may be included in the client device (105). In yet another example, the WAF service module (125) may be included in the server (115). In still another example, various components of the WAF service module (125) may be included in the client device (105), the server (115), a separate server, or combinations thereof.

Figure 2:
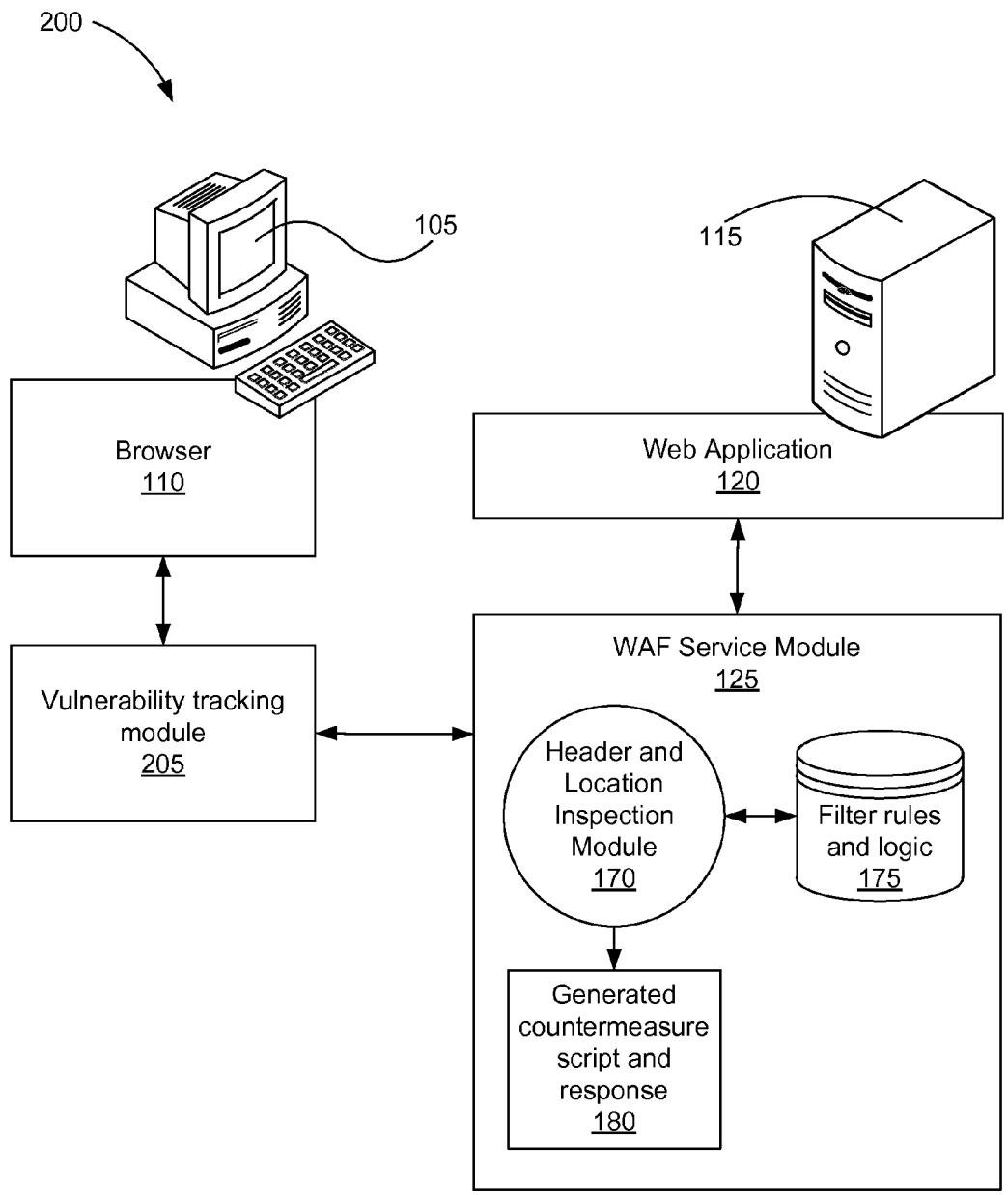
FIG. 2 is a block diagram depicting a system for monitoring and mitigating client-side exploitation of web-application flaws according to another example of the principles described herein.

The system (100) may further comprise a vulnerability tracking module (205). Turning now to FIG. 2, a block diagram depicting a system (200) for monitoring and mitigating client-side exploitation of web-application flaws is shown according to another example of the principles described herein. The vulnerability tracking module (205) may track all defects in the processed headers that were detected by the header and location inspection module (170). Therefore, unlike a firewall solution where underlying vulnerabilities are covered up, the vulnerability tracking module (205) may allow an operator to track these defects and vulnerabilities. As a result, an organization may be able to prevent future security problems by leveraging the information retrieved from the vulnerability tracking module (205) when the system (100, 200) is in operation.

Figure 3:
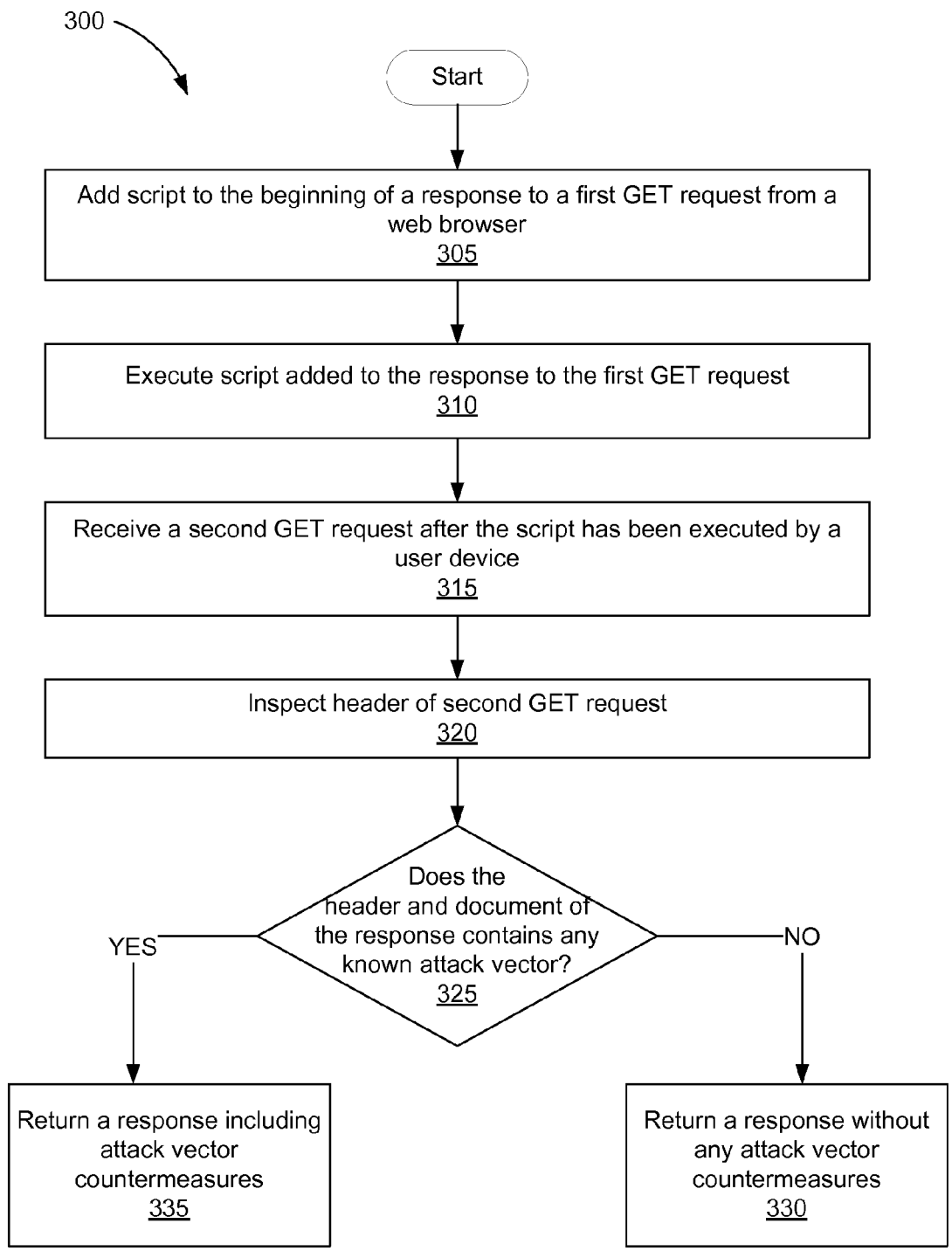
FIG. 3 is a flowchart showing a method of monitoring and mitigating client-side exploitation of web-application flaws according to one example of the principles described herein.

FIG. 3 is a flowchart showing a method of monitoring and mitigating client-side exploitation of web-application flaws according to one example of the principles described herein. The method may begin with adding (305) script to the beginning of a response to a first request from a web browser. As described above the addition of the script at the beginning of the response allows the script to be executed first allowing the script, being executed by the processor, control over the document object model.

The method may continue with the script added to the response being executed by the processor of a user device and a second GET request being received (310) by the WAF service module (FIGS. 1 and 2, 125). As described above the header of the second GET request comprises the contents of the document as well as the name of the location of the attack vector used by a third party in a cross-site scripting attack.

The WAF service module (125) may then inspect the header of the second GET request and, using filter rules and logic (FIGS. 1 and 2, 175) determine (325) whether the header and document of the response contains any known attack vector. If the header and document of the response does not contain an attack vector (NO Determination, 325), the WAF service module (125) then returns (330) a response to the browser (110) with no countermeasures included in the response. If the header and document of the response does contain an attack vector (YES Determination, 325), the WAF service module (125) then returns (335) a response to the browser (110) including attack vector countermeasures included in the response.

Figure 4:
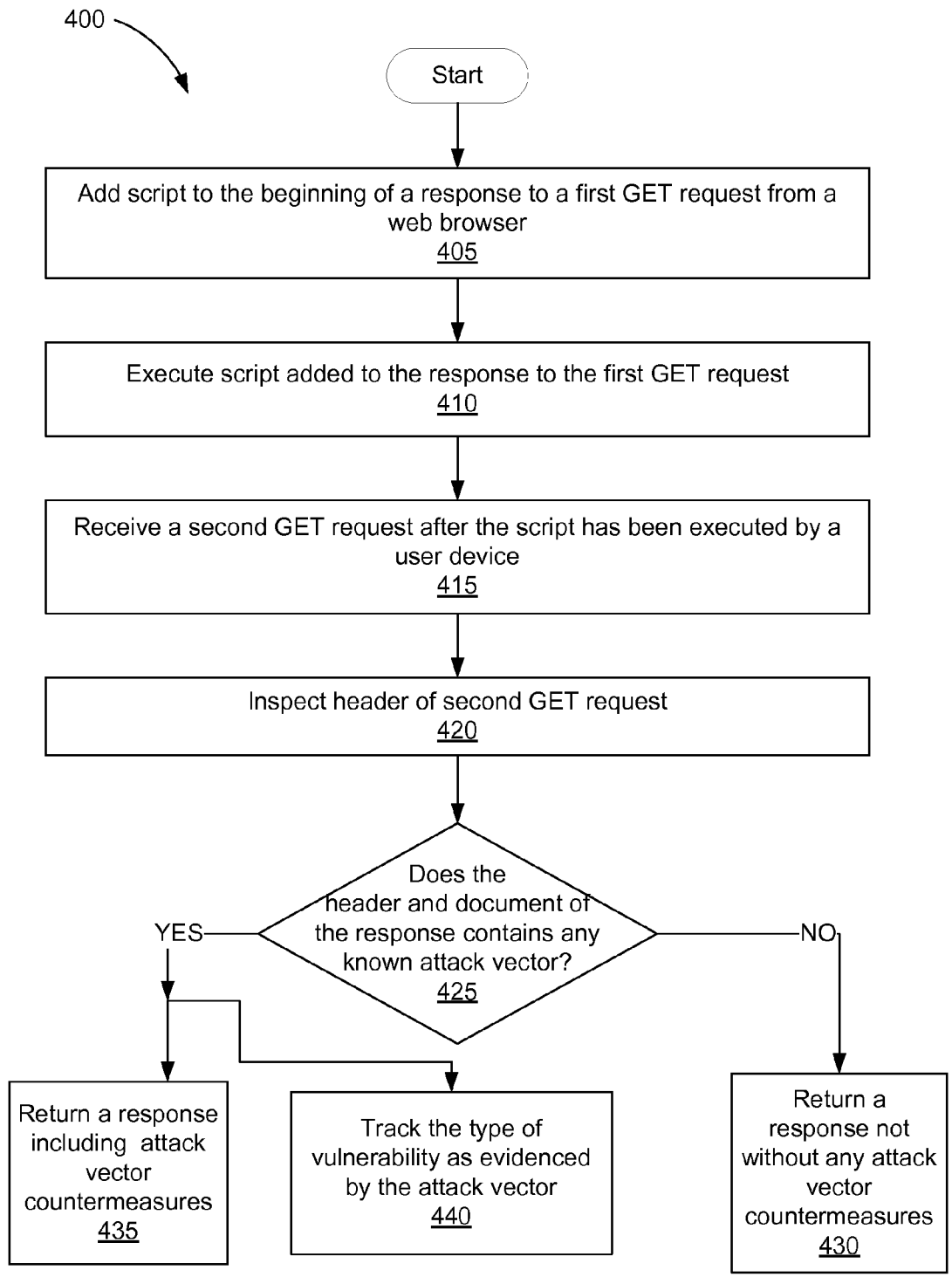
FIG. 4 is a flowchart showing a method of monitoring and mitigating client-side exploitation of web-application flaws according to another example of the principles described herein.

FIG. 4 is a flowchart showing a method of monitoring and mitigating client-side exploitation of web-application flaws according to another example of the principles described herein. The method described in FIG. 4 is similar to that described in FIG. 3. In the example shown in FIG. 4, however, the WAF service module may, after determining that the header and document of the response contains an attack vector (YES Determination, 425), track (440) the type of vulnerability as evidenced by the attack vector. As described above, the vulnerability tracking module (205) may track (440) all defects in the processed headers that were detected by the header and location inspection module (170) and compile data describing the type of attack detected.

The present system and method may further be embodied in a computer program product for monitoring and mitigating client-side exploitation of web-application flaws. The computer program product comprises a computer readable storage medium comprising computer usable program code embodied therewith. The computer usable program code comprises computer usable program code to, when executed by a processor, adds script to the beginning of a response to a first request from a web browser. The computer usable program code may further comprise computer usable program code to, when executed by a processor, receive a second GET request, the second GET request comprising the contents of the document as well as the name of the location of the attack vector in the response used by a third party in a cross-site scripting attack. The computer usable program code may also comprise computer usable program code to, when executed by a processor, inspect the header of the second GET request and, using filter rules and logic (FIGS. 1 and 2, 175) determine whether the header and document of the response contains any known attack vector. The computer usable program code may still further comprise computer usable program code to, when executed by a processor, returns a response to the browser including attack vector countermeasures included in the response.

The process shown in FIGS. 3 and 4 may be implemented in a general, multi-purpose or single purpose processor. Such a processor will execute instructions, either at the assembly, compiled or machine-level, to perform that process. Those instructions can be written by one of ordinary skill in the art following the description of FIGS. 3 and 4 and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized wireline or wireless transmission signals.

The specification and figures describe a system and method to monitor and mitigate client-side exploitation of web-application flaws. The system and method described may provide for a more cost effective way to manage potential vulnerabilities as it relates to the implementation of web applications and communications between, for example, a client device and a server. Indeed, server side mitigation either by code fixes or the introduction of web application firewalls can be time and resource intensive, especially across large network organizations. Additionally, using firewalls prevents a network operator from gathering information regarding the frequency of exploitation and the type of attack. This information may lead to unnecessary debate amongst technical staff. This described system and method minimizes the need for in code mitigation or the roll out of expensive web application firewalls. Instead it utilizes a script reference presented to a monitoring and mitigation service which can be quickly and easily rolled-out via a number of mechanisms. In one example, the processor of each client device communicatively coupled to the web application may be utilized so as to spread the processing demands across a number of different client devices reducing the processing time for the web application server.

Additionally, unlike server only mitigation, the system and method mitigates cross site scripting exploitation by utilizing the GET request transportation which is delivered via a reflected document object model (DOM) vector. This type of exploitation takes advantage of vulnerable code delivered via the HTTP response and can be crafted in such a way so that server-side controls cannot see the attack.

Still further, unlike some approaches to mitigate cross site scripting exploitation via a browser's resident code, the system and method does not remove the ability for web application owners to control what is and is not mitigated. Removing such abilities, may instead lead to situations wherein legitimate web applications fails as a result of certain overzealous actions taken to mitigate the cross site scripting exploitation.

The preceding description has been presented to illustrate and describe examples of the principles described. This description is not intended to be exhaustive or to limit these principles to any precise form disclosed. Many modifications and variations are possible in light of the above teaching.

What is claimed is:

1. A system for monitoring and mitigating client-side exploitation of application flaws, the system comprising:
    a server to operate a first application, the first application to communicate with a client device operating a second application to execute an application flaw script and the application flaw script to cause the client device to produce a first request associated with vulnerability of the first application; and
    an application flaw service module communicatively coupled to the server, the application flaw service module to:
    receive the first request from the client device comprising transactional metadata based on the application flaw script; and
    inspect the transactional metadata for malicious content within the first, wherein prior to the application flaw service module receiving and inspecting the transactional metadata within the first request, the server causes the application flaw script to be added to the transactional metadata of a response to a second request sent by the client device and wherein the application flaw service module is to inspect, with a header and location inspection module, the transactional metadata for malicious content within the first request by referring to a filter rules and logic database.

2. The system of claim 1, in which the first request is a GET request and in which the first application is a web-application.

3. The system of claim 1, in which the second application is a browser and the browser on the client device executes the application flaw script and generates the first request to the application flaw service module based on the application flaw script.

4. The system of claim 1, in which the application flaw service module further generates a countermeasure script and response and sends the response to the client device for execution of the countermeasures.

5. The system of claim 1, in which the application flaw service module inspects, with a header and location inspection module, the transactional metadata for malicious content within the first request by referring to a filter rules and logic database.

6. The system of claim 5, further comprising a vulnerability tracking module that tracks attack vectors in the received requests that are detected by the header and location inspection module.

7. The system of claim 1, wherein the application flaw service module is to receive the first request from the client device across a network.

8. A method of monitoring and mitigating client-side exploitation of application flaws comprising:
adding computer usable program code to the beginning of a first response to a first request from a client, the computer usable program code to perform a basic inspection of the first response;
receiving a second request from the client;
determining that transactional metadata within the second request response contains an attack vector with a header and location inspection module by referring to a filter rules and logic database; and
returning a second response to the second request to the client including attack vector countermeasures embedded in the second response.

9. The method of claim 8, further comprising tracking a type of vulnerability as evidenced by the attack vector.

10. The method of claim 8, in which the first and second requests are GET requests originating from a client device executing a web-application.

11. The method of claim 8, in which determining that the transactional metadata of the first response contains an attack vector further comprises comparing a number of filter rules and logic from a filter rules and logic database with the content of the request to determine if the first response contains an attack vector.

12. The method of claim 8, in which the computer usable program code added to the beginning of the first response to a first request is executed by a client device and in which the client device generates and sends the second request.

13. The method of claim 8, wherein the computer usable program code added to the beginning of the first response to the first request from the client to perform a basic inspection of the first response comprises an application flaw script added to transactional metadata of the first response, wherein the second request received from the client comprises the transactional metadata based on the application flaw script and wherein determining whether the transactional metadata within the second request contains malicious content comprising an attack vector is by inspecting the transactional metadata in a header of the second request using a header and location inspection module that refers to a filter rules and logic database.

14. A computer program product for monitoring and mitigating client-side exploitation of application flaws, the computer program product comprising:
a non-transitory computer readable storage medium comprising computer usable program code embodied therewith, the computer usable program code comprising:
computer usable program code to, when executed by a processor, add computer usable program code to a beginning of a first response to a first request from a client, the computer usable program code to perform a basic inspection of the first response;
computer usable program code to, when executed by a processor, receive a second request from the client;
computer usable program code to, when executed by a processor, determine that transactional metadata within the second request contains an attack vector with a header and location inspection module by referring to a filter rules and logic database; and
computer usable program code to, when executed by a processor, return a second response to the second request to the client including attack vector countermeasures embedded in the response.

15. The computer program product of claim 14, further comprising computer usable program code to, when executed by a processor, track a type of vulnerability as evidenced by the attack vector.

16. The computer program product of claim 14, in which the computer usable program code to determine that the transactional metadata of the first response contains an attack vector further comprises computer usable program code to, when executed by a processor, compare a number of filter rules and logic from a filter rules and logic database with the content of the request to determine if the first response contains an attack vector.

17. The computer program product of claim 14, wherein the computer usable program code added to the beginning of the first response to the first request from the client to perform a basic inspection of the first response comprises an application flaw script added to transactional metadata of the first response, wherein the second request received from the client comprises the transactional metadata based on the application flaw script and wherein determining whether the transactional metadata within the second request contains malicious content comprising an attack vector is by inspecting the transactional metadata in a header of the second request using a header and location inspection module that refers to a filter rules and logic database.

* * * * *